Nov. 18, 1941.  S. D'ARRIGO  2,262,991
BROCCOLI BUNDLING MACHINE
Filed Oct. 14, 1939  2 Sheets-Sheet 1

INVENTOR.
STEPHEN D'ARRIGO.
BY
ATTORNEY.

Nov. 18, 1941.	S. D'ARRIGO	2,262,991
BROCCOLI BUNDLING MACHINE
Filed Oct. 14, 1939    2 Sheets-Sheet 2

INVENTOR.
STEPHEN D'ARRIGO.
BY
ATTORNEY.

Patented Nov. 18, 1941

2,262,991

UNITED STATES PATENT OFFICE 2,262,991

BROCCOLI BUNDLING MACHINE

Stephen D'Arrigo, San Jose, Calif.

Application October 14, 1939, Serial No. 299,473

6 Claims. (Cl. 146—82)

This invention relates to bundling machines for an edible vegetable product known as broccoli and the like. The characteristic of this product is that the portion usually eaten constitutes a bunched head consisting of leaves and clusters of small buds, the leaves and buds being upon a stem or stalk of some considerable length. The stem in the region of the buds and leaves is also edible but its extension as a stalk is usually more fibrous and tough, and is discarded as having no more commercial value as a portion of the salable head. The head and leaves are of considerably greater diameter than the stalk, and the heads are of various sizes, thus requiring varying numbers of the head bunches to make up bundles of substantially uniform size. Therefore, it has been difficult to make a single package or bundle of an aggregate number of these head bunches and cut the ends of the stalks uniformly in one plane, so that the head bunches could be tied into a single bundle of neat, uniform appearance for convenience of packing in crates or inspection by the purchaser. Such bundling also makes the separate bundles of approximate uniform weight per unit and thus eliminates the necessity of weighing the product in loose or segregated heads in the course of dispensing it to customers. Another advantage of making bunches or bundles of this product is that in the handling thereof, breakage and damage is largely eliminated which is a large factor of loss where the product is handled commercially in its loose or segregated form.

The object of the present invention is to provide an apparatus for bundling heads of broccoli and the like, in bundle units of approximately uniform size, in a form in which a binding string or tie may be passed around the bundle while the bundle is under clamp pressure; and at the same time shear the refuse ends of the stalk from the bunch or bundle so as to provide bunches having even, uniform base ends.

Another object is to provide a device in which the bunched, bound and cut bundles of broccoli may be made of a substantially uniform length so that the tops of the bundles stacked in a crate will be substantially level.

With the foregoing and other objects in view, all of which will be more apparent as this description proceeds, the invention is exemplified in one form in the novel construction and combination of parts hereinafter described, illustrated in the accompanying drawings, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawings wherein.

Figure 1:
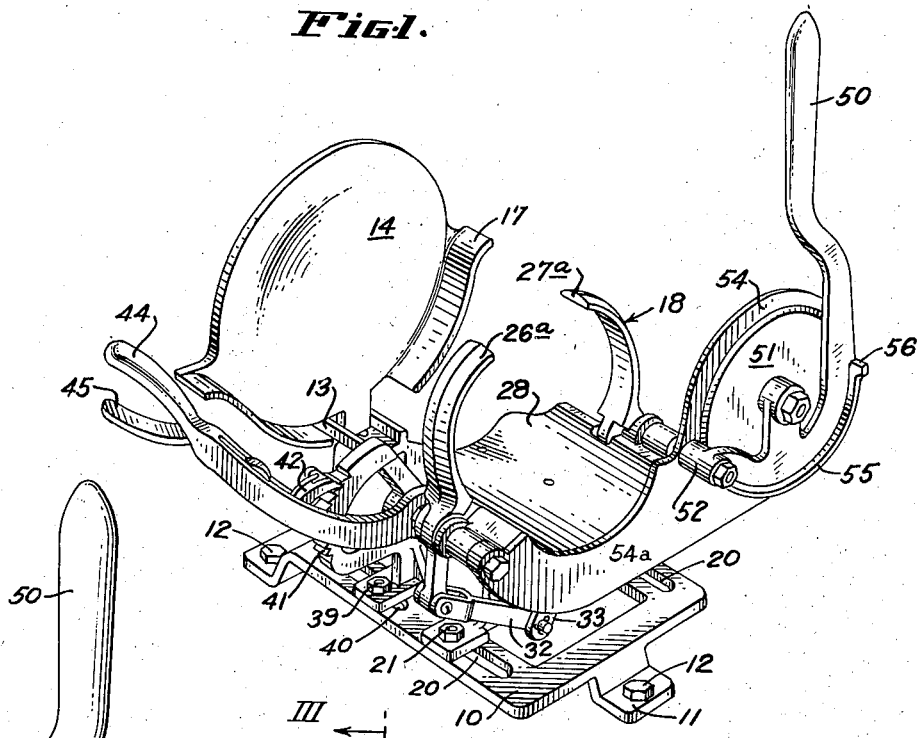
Fig. 1 is a perspective view of the apparatus.
Figure 2:
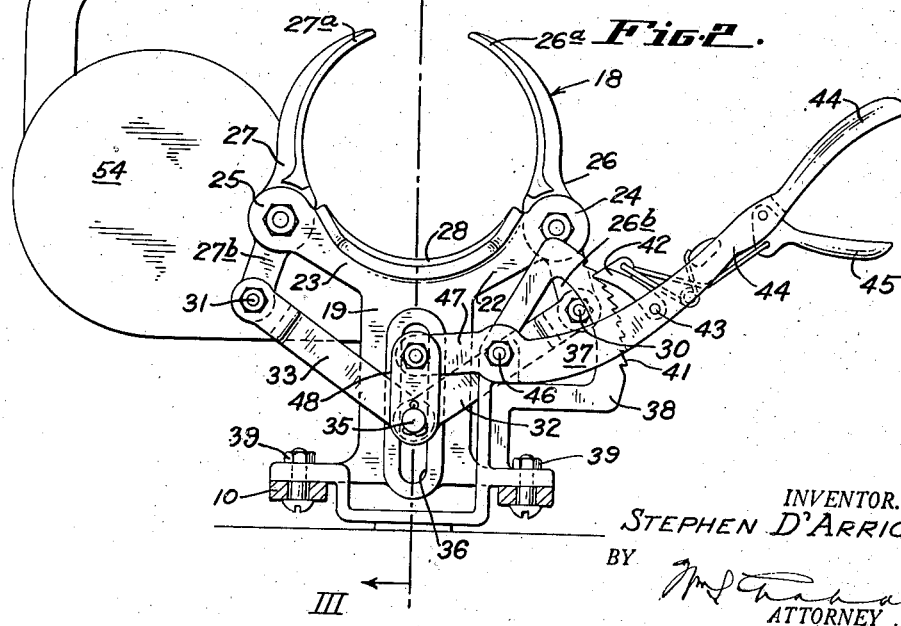
Fig. 2 is a vertical sectional view on line II—II of Fig. 3.
Figure 3:
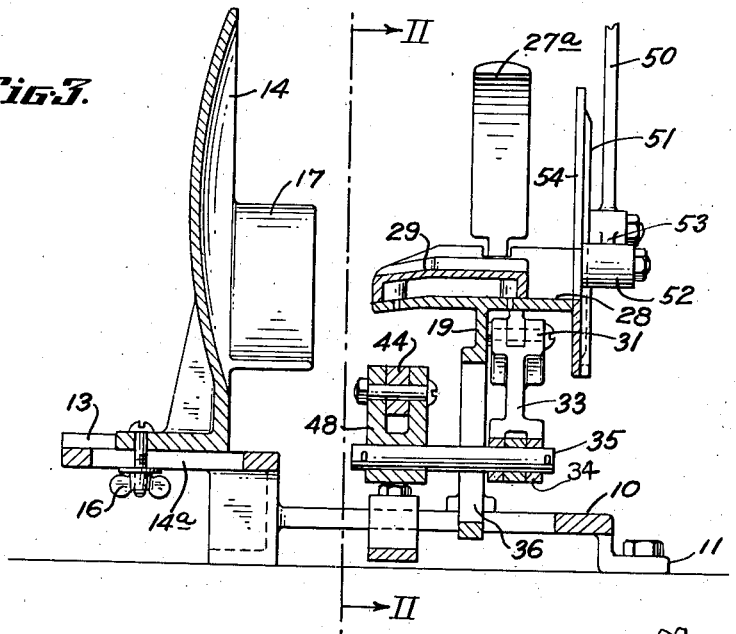
Fig. 3 is a longitudinal vertical section on line III—III of Fig. 2.

In the drawings, wherein like characters of reference indicate corresponding parts in the several views, 10 is a base which may be supported in a suitable manner as by lugs or feet 11 which may be securely attached to a work-bench by means of bolts 12. At one end (see left-hand of Fig. 1), there is provided a longitudinal channel or groove 13 which has an elongated slot 14$^a$. Slidably mounted in the channel 13 is a transversely disposed circular concavo-convex end plate 14, which is longitudinally adjustable in the channel 13 and slot 14$^a$ by a key or foot 15, the latter being releasably clamped in the slot 14$^a$ by suitable means such as bolt and wing nut 16. The end plate in the lower half of its circumference is provided with integral flanges 17 which extend axially toward a clamping means and support the head ends of the broccoli and arrange the several heads into a more or less circular form.

At the opposite end of the base 10 there is a clamping means generally indicated 18. The clamping means 18 is mounted on a support 19 which, if desired, may also be longitudinally adjustable on the base 10 by elongated slots 20 in which the support is adjustably secured by bolts 21. At its upper end the support 19 is bifurcated providing a pair of arms 22, 23. Each of the arms 22, 23, provide a bearing 24, 25 in which is pivotally fulcrumed a clamp lever 26, 27, the upper ends of which 26$^a$, 27$^a$ are arcuate and form cooperating jaws for a clamp for holding the stalk ends of the broccoli which are placed within said clamp upon a trough 28 which is supported by the bifurcated support arms 22, 23, said trough being preferably arcuate in lateral transverse section in substantially the same arcuate degree as the jaws 26, 27 so that the stems of the broccoli may be circularly formed for bundling, the extreme end of the trough having adjacent thereto a cooperating cutting knife hereafter described. If it is desired to make smaller bundles of the broccoli an arcuate filler or adapter 29 may be placed in the trough 28. The end of the clamp levers 26, 27 which are opposite to the clamp jaws 26$^a$, 27$^a$, have integral extension portions 26$^b$, 27$^b$, each of which is pivotally connected as at 30, 31 to the respective branches, 32, 33, of a toggle joint which has its knee 34 pivotally connected by a shaft 35, the latter being vertically reciprocable in vertical slot 36 of the support 19.

The shaft 35 is vertically reciprocable in slot 36 by means of a handle lever assembly generally indicated 37. The handle assembly 37 is mounted on the base frame 10 intermediate the end plate 14 and the support 19. This handle assembly may, if desired, be longitudinally adjustable by mounting same on a vertically upstanding bracket 38 which is releasably fixed to the frame 10, by bolts 39 through the longitudinal slot 40. The bracket 38 is provided with suitable ratchet means, such as a quadrant ratchet 41 which is engaged by a spring-actuated pawl 42 pivotally mounted at 43 on handle lever 44, a release trip 45 being provided adjacent the hand grip end portion of the handle, for manual manipulation to release the pawl 42. Adjacent its opposite end, the handle lever 44 is fulcrumed on a pivot 46, beyond which it has an extension 47 which pivotally engages a hanger 48, the latter being connected to shaft 35 which, as stated, is moved vertically in slot 36 by the knee 34 of the toggle joint. It is thus manifest that upon manipulation of the handle lever 44, cooperatively with manipulation of the ratchet and pawl, the toggle joint operates to open and close the arcuate jaws 26$^a$, 27$^a$ of the clamp, to compress into circular form the stems or stalks of the assembled heads of the product. While the stems of the broccoli are within the clamp they are tied with a string or any suitable binding member before the clamp is loosened.

Figure 4:
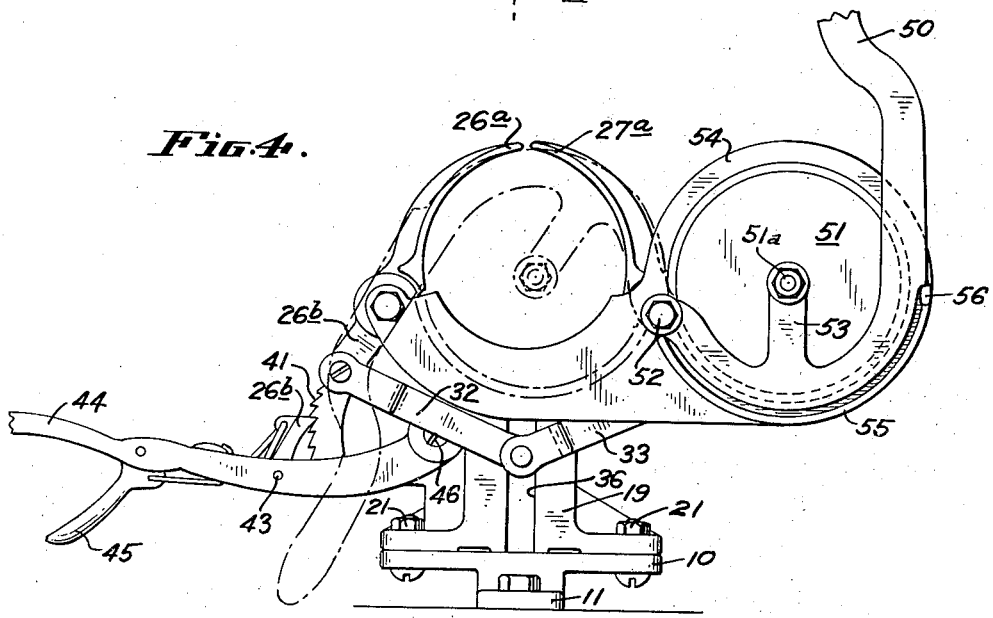
Fig. 4 is an end elevational view from right hand of drawing.
Figure 5:
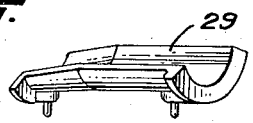
Fig. 5 is a perspective view of an adapter member.

While the broccoli is within the clamp, the refuse ends of the stalk are severed therefrom by means of a shearing knife. This shearing knife assembly is located at the extreme end of the trough 28 and comprises a knife lever 50 which carries a knife blade 51, the latter being preferably circular in shape to provide renewed cutting edges by successively rotating same on its mounting 51$^a$. In the zone of the knife, the knife-lever 50 is circuitous in shape so as to provide a larger area of knife blade edge and knife surface for cutting through relatively thick bundles of broccoli. This circuitous shape is best shown in Figs. 1 and 4, the portion adjacent the knife blade being somewhat arcuate or offset from the moment arm of leverage. The knife-lever 50 is mounted at the terminal of its offset portion on the support 19 by pivot bearing 52 which is laterally offset from the axis of end plate 14 and clamp jaws 26$^a$, 27$^a$. The circular knife 51 is mounted at the circuitous or offset portion of the knife lever 50 by means of a radially inward extension or lug 53. In order to protect the operator from accidental injury and also to prevent the knife edge from damage, the knife is provided with an overlying guard 54 also carried by support 19, said guard having an angularly disposed flange 55 circumferentially of its lower peripheral portion, and on which a shoulder stop 56 of lever 50 rests when the lever and knife are not in use in the shearing operation. Thus the assembly of elements mounted on support 19 are longitudinally adjustable in unison, and the fixed relationship of the knife blade and clamp is maintained so that a good sharp, clean, cut is obtained uniformly at the severed ends of the broccoli stalks, instead of shredding them.

The guard 54 has an extended arm 54$^a$ having a concavely arcuate upper edge approximately aligned with, and for practical purposes is an extension of, the operative or upper arcuate surface of trough 28, whereby a shearing edge is provided at the end of trough 28 for the desired length of the bundled broccoli, the length being predetermined by adjustment of end plate 14.

While longitudinal adjustment is provided for end plate 14, and also support 19 which carries the assembly of handle lever 44, clamping members 26$^a$, 27$^a$, and the knife and guard, it is to be understood that where longitudinal adjustment is made of the end plate, no such longitudinal adjustment is necessary in said other two assemblies. As a matter of choice, it is preferred that any necessary longitudinal adjustment be accomplished by movement of the end plate.

In operation, the head end of the broccoli is positioned by end plate 14 with the stem portion engaged within the jaws of the clamp which is tightened by the handle lever and ratchet while the bundle is tied with a binding strap or string. Before releasing the clamp the knife-lever and knife is operated by moving it forwardly and downwardly on its pivotal mounting, thus severing the refuse stalk evenly. The knife-lever is then raised to its non-cutting position as shown in Fig. 1 after which the handle-lever and ratchet release are manipulated to release the ratchet and clamp jaws which completes a cycle of operation, and the bundled broccoli is removed from the apparatus.

Having thus described my invention, what I claim and desire to secure by Letters Patent is:

1. A bundling and cutting device for broccoli and the like, comprising an end plate mounted at one end portion, a support at the opposite end portion, a trough mounted on the support for receiving loose stalks of broccoli thereon, a jaw clamp having pivotally mounted arms free at one end to grip the broccoli assembled in the trough, a toggle joint which has its respective bars pivotally connected to the other ends of the respective clamp arms, means for actuating the clamp jaws to releasably hold broccoli within the clamp, a knife-lever mounted pivotally in offset relation to the longitudinal axis of the trough, a knife blade carried by said knife-lever, and a guard to shield the knife blade when in non-cutting position, the said first mentioned end plate having an arcuate axially extended flange at its lower portion adapted for supporting the heads of bunches of broccoli when the same are being assembled in the clamp.

2. A bundling and cutting device for broccoli and the like, comprising an end plate mounted at one end portion, said end plate having at its lower portion axially extended downwardly converging flanges, a support mounted for longitudinal adjustment at the opposite end portion and having mounted thereon an assembly of a trough for receiving loose stalks of broccoli thereon, a jaw clamp having pivotally mounted arms free at one end to grip the broccoli assembled in the trough, a toggle joint which has its respective bars pivotally connected to the other ends of the respective clamp arms, a ratchet by which the clamp jaws may be releasably fixed at selective positions to hold broccoli within the clamp, a lever pivotally mounted intermediate the end plate and the clamp and having a free end providing a handle, a means adjacent the handle of said lever for releasing the ratchet, a knife-lever mounted pivotally in offset relation to the longitudinal axis of the trough, a knife blade carried by said knife-lever, and a guard to shield the knife blade when in non-cutting position, said assembly being longitudinally adjustable as a unit on said support.

3. In a bundling and cutting device for bunched broccoli, a support, a trough mounted on the support for receiving loose stalks of broccoli thereon, an end plate adjacent one end of the trough and having axially extended downwardly converging flanged guide members, a jaw clamp having pivotally mounted arms free at one end to grip the broccoli assembled in the trough, means to grip the clamp jaws around the assembled broccoli, a knife-lever mounted pivotally in offset relation to the longitudinal axis of the trough and having an extended lug arm, a knife blade mounted on said lug arm of the knife-lever, and means for releasing the clamp jaws after a cutting operation by said knife, said knife lever having a portion adjacent its pivotal mounting which is offset from the moment arm of leverage, and said lug arm extending inwardly at said offset portion, whereby the mounting of the knife on said arm is spaced from the main body of the knife lever.

4. In a bundling and cutting device for bunched broccoli, a support, a trough mounted on the support for receiving loose stalks of broccoli thereon, an end plate adjacent one end of the trough and having axially extended downwardly converging flanged guide members, a jaw clamp having pivotally mounted arms free at one end to grip the broccoli assembled in the trough, means to grip the clamp jaws around the assembled broccoli, a knife-lever mounted pivotally in offset relation to the longitudinal axis of the trough and having an extended lug arm, a knife blade mounted on said lug arm of the knife-lever, a guard to shield the knife blade when in non-cutting position, and means for releasing the clamp jaws after a cutting operation by said knife, said knife lever having a portion adjacent its pivotal mounting which is offset from the moment arm of leverage, and said lug arm extending inwardly at said offset portion, whereby the mounting of the knife on said arm is spaced from the main body of the knife lever.

5. In a bundling and cutting device for bunched broccoli, a support, a trough mounted on the support for receiving loose stalks of broccoli thereon, an end plate adjacent one end of the trough and having axially extended downwardly converging flanged guide members, a jaw clamp having pivotally mounted arms free at one end to grip the broccoli assembled in the trough, means to grip the clamp jaws around the assembled broccoli, a knife-lever mounted pivotally in offset relation to the longitudinal axis of the trough, said knife-lever having a portion at its mounted end offset from its moment arm of leverage, said offset portion being provided with an extended lug, a knife blade carried by said knife-lever on said extended lug, a guard to shield the knife blade when in non-cutting position, and means for releasing the clamp jaws after a cutting operation by said knife, said lug extending radially inwardly at the offset portion of the knife lever whereby the mounting of the knife on said lug is spaced from the main body of said lever.

6. In a bundling and cutting device for bunched broccoli, a longitudinally adjustable support, an assembly mounted on said support comprising a trough mounted on the support for receiving loose stalks of broccoli thereon, an end plate adjacent one end of the trough and having axially extended downwardly converging flanged guide members, a jaw clamp having pivotally mounted arms free at one end to grip the broccoli assembled in the trough, means to grip the clamp jaws around the assembled broccoli, a knife-lever mounted pivotally in offset relation to the longitudinal axis of the trough, a knife blade carried by said knife-lever, a guard to shield the knife blade when in non-cutting position, said knife-lever being provided with a stop means to position the knife in said guard, and means for releasing the clamp jaws after a cutting operation by said knife, said knife blade and said clamp having fixed relationship whereby the clamp and blade are longitudinally adjustable in unison.

STEPHEN D'ARRIGO.